United States Patent
Cho

(10) Patent No.: US 9,257,701 B2
(45) Date of Patent: Feb. 9, 2016

(54) ELECTROCHEMICAL CELL

(75) Inventor: Jaephil Cho, Yongin-si (KR)

(73) Assignee: Industry-University Cooperation Foundation, Hanyang University, Seoul (KR)

( * ) Notice: Subject to any disclaimer, the term of this patent is extended or adjusted under 35 U.S.C. 154(b) by 604 days.

(21) Appl. No.: 12/234,268

(22) Filed: Sep. 19, 2008

(65) Prior Publication Data

US 2009/0305140 A1 Dec. 10, 2009

(30) Foreign Application Priority Data

Jun. 5, 2008 (KR) .................. 10-2008-0053354

(51) Int. Cl.
*H01M 4/505* (2010.01)
*H01M 4/485* (2010.01)
*H01M 4/525* (2010.01)

(52) U.S. Cl.
CPC .............. *H01M 4/505* (2013.01); *H01M 4/485* (2013.01); *H01M 4/525* (2013.01); *Y02E 60/122* (2013.01)

(58) Field of Classification Search
CPC ...... H01M 4/505; H01M 4/485; H01M 4/525
USPC ................. 429/231.95, 221, 223, 224, 231.1, 429/231.3, 231.5
See application file for complete search history.

(56) References Cited

U.S. PATENT DOCUMENTS

2006/0216603 A1* 9/2006 Choi .................. 429/231.95

FOREIGN PATENT DOCUMENTS

| KR | 10-2004-0058667 | 7/2004 |
| KR | 10-0784589 | 7/2007 |
| KR | 10-2008-0042962 | 5/2008 |
| KR | 10-2008-0100031 | 11/2008 |

OTHER PUBLICATIONS

Park, Dae-Hoon; Lim, Seung-Tae; Hwang, Seong-Ju, A soft chemical route to multicomponent lithium transition metal oxide nanowires as promising cathode materials for lithium secondary batteries, Electrochemical Acta 52 (2006) 1462-1466.*
Zhou, Yingke; Li, Hulin, Synthesis of high-ordered LiNi0.5Co0.5O2 nanowire arrays by AAO template and its structural properties, Journal of Materials Science 37 (2002) 5261-5266.*
Yingke Zhou and Hulin Li, Sol-Gel Template Synthesis of Highly Ordered LiCo0.5Mn0.5O2 Nanowire Arrays and Their Structural Properties, Journal of Solid State Chemistry, 165, 247-253 (2002).*
Lee Yoojung, Layered Li0.88[Li0.18Co0.33Mn0.49]O2 Nanowires for Fast and High Capacity Li-Ion Storage Material, Nano Letters 2008 vol. 8, No. 3 pp. 957-961, Feb. 13, 2008.

* cited by examiner

*Primary Examiner* — Ula C Ruddock
*Assistant Examiner* — Thomas Parsons
(74) *Attorney, Agent, or Firm* — Lucas & Mercanti, LLP

(57) ABSTRACT

The present invention relates to a positive active material for an electrochemical cell including a compound having a nano-shape and represented by the following Formula 1.

$$Li_x[Li_{1-y-z}M^1_y M^2_z]O_{2-\alpha}D_\alpha \quad \text{[Formula 1]}$$

wherein, $0.8 \leq x \leq 1.1$, $0 \leq y \leq 0.5$, $0 \leq z \leq 0.5$, and $0 \leq \alpha \leq 0.05$,
$M^1$ and $M^2$ are independently selected from transition elements, and
D is selected from the group consisting of O, F, S, P, and combinations thereof.

The positive active material of the present invention has high reversible capacity and an excellent cycle life characteristic, and in particular, an excellent cycle life characteristic at a high rate.

15 Claims, 4 Drawing Sheets

ELECTROCHEMICAL CELL

CROSS-REFERENCE TO RELATED APPLICATION

This application claims priority to and the benefit of Korean Patent Application No. 10-2008-0053354 filed in the Korean Intellectual Property Office on Jun. 5, 2008, the entire contents of which are incorporated herein by reference.

BACKGROUND OF THE INVENTION (a) Field of the Invention

The present invention relates to an electrochemical cell. More particularly, the present invention relates to an electrochemical cell having excellent reversible capacity and cycle life characteristics.

This work was supported by the IT R&D program of MKE/IITA [Core lithium secondary battery anode materials for next generation mobile power module, 2008-F-019-01].

(b) Description of the Related Art

A battery as a power source for a portable electronic device and an electric vehicle has been increasingly required to have high performance and large capacity.

In general, a battery generates electric power by using electrochemical reaction materials at positive and negative electrodes. For example, a lithium secondary battery generates electric power due to chemical potential change, when lithium ions are intercalated and deintercalated from positive and negative electrodes.

The lithium secondary battery is fabricated by using a material capable of reversibly intercalating and deintercalating lithium ions as positive and negative active materials and charging an organic electrolyte solution or a polymer electrolyte solution between the positive and negative electrodes.

Recently, a nano-material has been actively researched as an active material for these batteries. Since the nano-material has a high surface area, it can provide higher electrode and electrolyte contact areas, which can lead to shorter diffusion paths with the particles and more facile intercalation for lithium ions.

A positive nano-active material has been reported to be prepared as a nanowire such as lithium- and Ni-deficient $Li_xMn_{0.67}Ni_{0.3}O_2$ formed by chemical oxidation of pristine bulk $LiMn_{0.5}Ni_{0.5}O_2$ powder. Since the positive active material is acid-treated, it has an extreme lack of lithium. In other words, the compound has x of less than 1. The nanowire has reversible capacity of about 160 mAh/g between 4.8 and 2 V at a current density of 20 mA/g.

Recently, among lithium composite metal oxides, Mn-rich lithium metal oxides such as in a $Li[Li_{1/3-2x/3}Mn_{2/3-x/3}M_x]O_2$ positive electrode are currently receiving significant interest as a positive active material. These materials can provide initial capacity of greater than 200 mAh/g at 4.5V or higher. However, in spite of the capacity advantages, a rapid capacity fade incurs higher C rates. For example, capacity fade of over 50% is observed when the current is increased from 20 to 200 mAh/g in a $Li[Ni_{0.2}Li_{0.2}Mn_{0.6}]O_2$ active material. Furthermore, a $Li[Ni_{0.41}Li_{0.08}Mn_{0.51}]O_2$ nanoplate active material has been reported to be prepared in a co-precipitation method to improve high rate characteristics of a battery. However, there has still been research on improvement of high rate characteristics of a battery.

SUMMARY OF THE INVENTION

An exemplary embodiment of the present invention provides a positive active material for an electrochemical cell having excellent reversible capacity and cycle life characteristics, and particularly an excellent cycle life characteristic at a high rate.

Another embodiment of the present invention provides a method of preparing the positive active material.

Yet another embodiment of the present invention provides an electrochemical cell including the positive active material.

The present invention is not limited by the aforementioned technical objects, and other objects can be clearly understood by a person of ordinary skill in the art.

According to a first embodiment of the present invention, provided is a positive active material having a nanowire shape and represented by the following Formula 1.

$$Li_x[Li_{1-y-z}M^1_yM^2_z]O_{2-\alpha}D_\alpha \qquad \text{[Formula 1]}$$

(wherein $0.8 \leq x \leq 1.1$, $0 \leq y \leq 0.5$, $0 \leq z \leq 0.5$, and $0 \leq \alpha \leq 0.05$, $M^1$ and $M^2$ are independently selected from transition elements, and D is selected from the group consisting of O, F, S, P, and combinations thereof).

According to a second embodiment of the present invention, the positive active material is prepared in a method including preparing an oxide nanowire including $M^1$ and $M^2$, mixing the oxide nanowire with a lithium compound, allowing the mixture to stand, and drying the product.

According to a third embodiment of the present invention, provided is an electrochemical cell including the positive active material.

The positive active material of the present invention has excellent reversible capacity and cycle life characteristics, and particularly an excellent cycle life characteristic at a high rate.

DETAILED DESCRIPTION OF THE INVENTION

Figure 1:
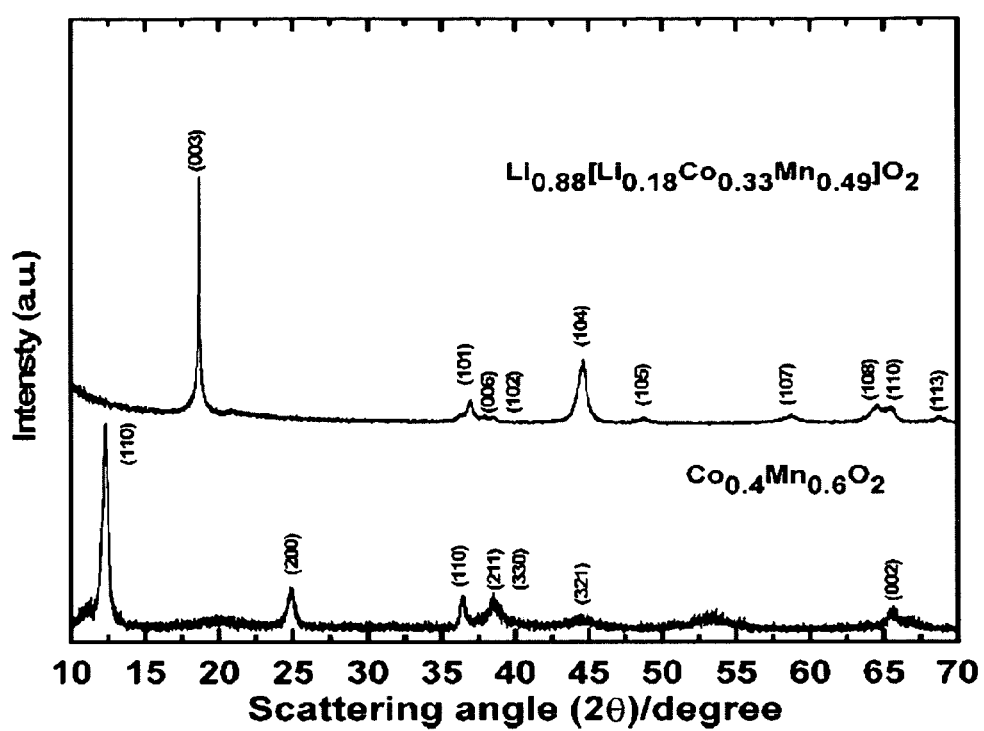
FIG. 1 is a graph showing X-ray diffraction measurements of a $Co_{0.4}Mn_{0.6}O_2$ nanowire and a $Li_{0.88}[Li_{0.12}Co_{0.33}Mn_{0.49}]O_2$ nanowire positive active material according to Example 1 of the present invention.

Hereinafter, embodiments of the present invention are illustrated in more detail. However, the present invention is not limited thereto but is defined by the following claims.

According to a first embodiment of the present invention, a positive active material includes a compound having a nanowire shape and that is represented by the following Formula 1.

[Formula 1]

wherein, $0.8 \leq x \leq 1.1$, $0 \leq y \leq 0.5$, $0 \leq z \leq 0.5$, and $0 \leq \alpha \leq 0.05$;

$M^1$ and $M^2$ are independently selected from transition elements, wherein $M^1$ is selected from the group consisting of Al, Ni, Co, Mn, Cr, Fe, and combinations thereof, and $M^2$ is selected from the group consisting of Al, Ni, Co, Mn, Cr, Fe, and combinations thereof; and D is selected from the group consisting of O, F, S, P, and combinations thereof.

In the above Formula 1, the bracket "[ ]" denotes that lithium is substituted with a part of $M^1$ and $M^2$ metal sites. When lithium is substituted with a part of $M^1$ and $M^2$ metal sites, the cell has flatness at about 4.5V and thereby improved capacity.

According to the embodiment of the present invention, the nanowire of a positive active material has a length ranging from 0.5 μm to 50 μm. When the nanowire has a length of shorter than 0.5 μm, it may have a smaller lithium reaction site and thereby a deteriorated high rate characteristic. The longer the nanowire is, the better it is. However, a nanowire is virtually impossible to prepare beyond 50 μm long, and is appropriately at most 50 μm long.

Furthermore, the nanowire may have a diameter ranging from 50 to 100 nm. When the nanowire has a diameter of smaller than 50 nm, it may have a negative reaction with an electrolyte solution and thereby increased irreversible capacity. On the other hand, when it has a diameter of larger than 100 nm, it may have a deteriorated high rate characteristic.

According to the embodiment of the present invention, a positive active material has a nanowire shape and a layered structure. The nanowire structure has more sites for intercalation/deintercalation of lithium ions and a shorter lithium diffusion distance, and can thereby improve the high rate characteristic.

According to a second embodiment of the present invention, a positive active material can be prepared to have a nanowire shape in a manufacturing method according to a hydrothermal reaction.

First of all, an oxide nanowire is prepared to include $M^1$ and $M^2$. Hereinafter, the manufacturing process of an oxide nanowire is illustrated in more detail.

A gel is prepared by adding a gel formant to an $M^1$ compound solution. Herein, the $M^1$ compound may include a compound including a metal element consisting of Al, Ni, Co, Mn, Cr, Fe, and combinations thereof. The compound may include a halide, a nitrate, and the like, for example $KMnO_4$. The $M^1$ compound solution may include water, ethanol, or hexane as a solvent. The gel formant may include fumaric acid.

Next, the gel is firstly heat-treated. This first heat treatment is performed at a temperature ranging from 400 to 700° C. for 1 to 20 hours. When the first heat treatment is performed at a temperature of 700° C. or higher, the final product may have a destroyed structure. When it is performed at a temperature of 400° C. or lower, $KMnO_4$ that is not completely crystallized and is destroyed may be prepared.

Then, the heat treated gel is mixed with an $M^2$ compound. The $M^2$ compound may include a metal element consisting of Al, Ni, Co, Mn, Cr, Fe, and a combination thereof. For example, it may include a nitrate, a halide, and hydrates thereof. The $M^2$ compound may in particular include $CoNO_{3.6}\cdot6H_2O$, $CoCl_2$, $NiNO_{3.6}\cdot6H_2O$, $NiCl_2$, or combinations thereof. The heat-treated gel is mixed with $M^2$ in a mixture weight ratio ranging from 1:10 to 1:50.

Then, the mixture is secondarily heat-treated. Accordingly, an oxide nanowire can include $M^1$ and $M^2$ from this aforementioned process. The secondary heat treatment is performed at a temperature ranging from 150 to 250° C. for 2 to 48 hours. When the secondary heat treatment is performed out of the temperature range, a desired product cannot be acquired. The oxide nanowire has a diameter ranging from 20 to 60 nm and a length ranging from 0.5 μm to 50 μm.

Then, the oxide nanowire is mixed with a lithium compound. The lithium compound may include lithium nitrate, lithium acetate, lithium hydroxide, and the like, but is not limited thereto. The oxide nanowire is mixed with a lithium compound in a weight ratio ranging from 1:2 to 1:4. In this process, a metal compound can be further added. When the metal compound is added, a final product may include a metal partly substituted with manganese. The metal may include Al, Ni, Co, Cr, or Fe. For example, a metal compound may include the metal oxide, nitrate salt, acetate salt, or hydroxide. The mixing process can be performed in a dry method, or in a wet method by using an organic solvent as a mixing medium. The organic solvent may include alcohol or acetone, such as ethanol and the like.

Next, the mixture is allowed to stand at a temperature ranging from 200 to 250° C. for 12 to 48 hours. When the process is performed under a condition out of the temperature and time ranges, a positive active material having a wire shape cannot be acquired.

Then, the resulting product is dried at a temperature ranging from 100 to 200° C. for 12 to 48 hours.

When an oxide nanowire is mixed with a lithium compound, the oxide nanowire may have a somewhat increased diameter, thereby resulting in a diameter ranging from 50 nm to 100 nm and a length ranging from 0.5 μm to 50 μm in a final positive active material.

[Formula 1]

wherein, $0.8 \leq x \leq 1.1$, $0 \leq y \leq 0.5$, $0 \leq z \leq 0.5$, and $0 \leq \alpha \leq 0.05$;

$M^1$ and $M^2$ are independently selected from transition elements, wherein $M^1$ is selected from the group consisting of Al, Ni, Co, Mn, Cr, Fe, and combinations thereof and $M^2$ is selected from the group consisting of Al, Ni, Co, Mn, Cr, Fe, and combinations thereof; and D is selected from the group consisting of O, F, S, P, and combinations thereof.

According to the embodiment of the present invention, the positive active material can be useful for a positive electrode of an electrochemical cell such as a lithium secondary battery. The lithium secondary battery includes a positive electrode, a negative electrode including a negative active material, and an electrolyte.

The positive electrode is prepared by preparing a positive active material composition by mixing a positive active material of the present invention, a conductive material, a binder, and a solvent, and then coating and drying the positive active material composition on an aluminum current collector. Alternatively, the positive electrode is prepared by casting the positive active material composition on a separate supporter, peeling a film therefrom, and laminating the film on an aluminum current collector.

Herein, the conductive material may include carbon black, graphite, or a metal powder. The binder may include a vinylidene fluoride/hexafluoropropylene copolymer, polyvinylidene fluoride, polyacrylonitrile, polymethylmethacrylate, polytetrafluoroethylene, and mixtures thereof. In addition, the solvent may include N-methylpyrrolidone, acetone, tetrahydrofuran, decane, and the like. The positive active material, conductive material, binder, and solvent are used in a common ratio used for a lithium secondary battery.

Like the positive electrode, the negative electrode is prepared by preparing a negative active material composition by mixing a negative active material, a binder, and a solvent, and coating the anode active material composition on a copper current collector, or casting a negative active material film by prepared by coating the composition a substrate and peeling a film therefrom. Herein, the negative active material composition may further include a conductive material, if necessary.

The negative active material may include a material that can intercalate/deintercalate lithium ions, for example a lithium metal or a lithium alloy, coke, artificial graphite, natural graphite, an organic polymer compound combustible material, carbon fiber, and the like. In addition, the conductive material, binder, and solvent are the same as used in the positive electrode.

The separator may include any one used for a lithium secondary battery, for example a single layer separator of polyethylene, polypropylene, or polyvinylidene fluoride, a double-layered separator such as polyethylene/polypropylene, or a triple-layered separator such as polyethylene/polypropylene/polyethylene and polypropylene/polyethylene/polypropylene, and the like.

The electrolyte charged into a lithium secondary battery may include a non-aqueous electrolyte, a well-known solid electrolyte, or the like, in which a lithium salt is dissolved.

The solvent used in the non-aqueous electrolyte has no particular limit, but may include a cyclic carbonate such as ethylene carbonate, propylene carbonate, butylene carbonate, vinylene carbonate, and the like; a linear carbonate such as dimethylcarbonate, methylethyl carbonate, diethyl carbonate, and the like; an ester series such as acetic acidethyl, propyl acetate, methyl propionate, ethyl propionate, γ-butyrolactone, and the like; an ether series such as 1,2-dimethoxyethane, 1,2-diethoxyethane, tetrahydrofuran, 1,2-dioxane, 2-methyltetrahydrofuran, and the like; a nitrile series such as acetonitrile and the like; and an amide series such as dimethylformamide and the like. They can be used as singularly or in combination. Particularly, the cyclic and linear carbonates are appropriately used as a mixed solvent.

As for the electrolyte, a gel-typed polymer electrolyte prepared by impregnating a polymer electrolyte such as polyethylene oxide, polyacrylonitrile, and the like in an electrolyte solution or an inorganic solid electrolyte such as LiI, $Li_3N$, and the like can be used.

Herein, the lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiCl$, and $LiI$.

The present invention is illustrated in more detail using the following examples. However, the following examples are exemplary embodiments of the present invention and do not limit the present invention.

Example 1

A solution containing 7.2 g of $KMnO_4$ and 200 ml of distilled water was slowly stirred for 30 min at 40° C. and had 2.1 g of fumaric acid added thereto, which resulted in a rapid endothermic reaction, forming a brown gel. This gel was annealed at 400° C. for 6 hours and again at 700° C. for 12 hours, and the resulting dark black powder was thoroughly washed with water 6 times, followed by vacuum-drying at 200° C. overnight.

The resulting product was confirmed to be K-birnessite, $K_{0.3}MnO_2$, with an inductively coupled plasma mass spectrometry (ICP-MS, ICPS-1000IV, Shimadzu) analysis.

The $K_{0.3}MnO_2$ was mixed with $Co(NO_3)_6 \cdot 6H_2O$ in a weight ratio of 1:8 in 100 ml of distilled water. The mixture was kept in an autoclave for 5 days at 200° C., and then finally washed with water 6 times to remove impurities that did not participate in the reaction, and dissolved K ions. The product was examined with ICP-MS and identified as a $Co_{0.4}Mn_{0.6}O_2$ nanowire. This nanowire had a diameter of 50 nm and a length of 1 μm.

$LiNO_3 \cdot H_2O$ was mixed with the $Co_{0.4}Mn_{0.6}O_2$ nanowire in a weight ratio of 4:1 in 100 ml of distilled water. The mixture was transferred to an autoclave and allowed to stand at 200° C. for 2 days. The prepared powder was rinsed with water and dried under vacuum at 120° C. to prepare a $Li_{0.88}[Li_{0.18}Co_{0.33}Mn_{0.49}]O_2$ nanowire positive active material. The positive active material nanowire had a diameter of 80 nm and a length of 1 μm. In addition, this positive active material had a layered structure.

Next, a positive electrode was prepared by mixing 20 mg of the positive active material, Super P carbon black (3M, Belgium), and a polyvinylidene fluoride binder (Kureha Co., Japan) in a weight ratio of 90:5:5 in N-methyl-2-pyrrolidone to prepare a slurry, then coating the slurry on an Al-foil, and drying it at 130° C. for 20 minutes. Herein, the positive active material was loaded in an amount of 20 mg/cm² (this load denotes an electrode thickness except for 20 μm of an Al current collector).

Then, a coin-type test cell (size 2016) was fabricated by using the positive electrode, a lithium counter electrode, and a micro-porous polyethylene separator inside a helium-filled globe box. As an electrolyte, 1M $LiPF_6$ in ethylene carbonate/diethylene carbonate/ethylmethyl carbonate mixed in a ratio of 30:30:40 volume %) (Cheil Industries, Korea) was used. After the electrolyte was added, the test cell was aged at room temperature for 24 hours before commencing the electrochemical tests.

Comparative Example 1

A battery was fabricated according to the same method as in Example 1, except for using $Li[Ni_{0.20}Li_{0.2}Mn_{0.6}]O_2$ nanoparticles having an average particle diameter of 1 to 20 μm that were secondary particles (agglomerates) prepared by agglomerating primary particles having an average particle diameter of 80 to 200 nm.

Comparative Example 2

A battery was fabricated according to the same method as in Example 1, except for using $Li[Ni_{0.41}Li_{0.08}Mn_{0.51}]O_2$ nanoparticles with an average particle diameter of 20 to 200 nm as a negative active material.

XRD Measurement

The $Co_{0.4}Mn_{0.6}O_2$ nanowire and $Li_{0.88}[Li_{0.12}Co_{0.33}Mn_{0.49}]O_2$ nanowire positive active material of Example 1 were measured regarding X-ray diffraction pattern by using a Cu target tube. The results are shown in FIG. 1. As shown in FIG. 1, the $Co_{0.4}Mn_{0.6}O_2$ nanowire had two major peaks at about 12° (110) and about 25° (200) scattering angles. The results are similar to those of $Ni_{0.45}Mn_{0.55}O_2$ obtained from K-birnessite. Accordingly, the $Co_{0.4}Mn_{0.6}O_2$ nanowire turned out to have a similar structure to birnessite. In addition, the $Li_{0.88}[Li_{0.12}Co_{0.33}Mn_{0.49}]O_2$ nanowire positive active material of Example 1 had a hexagonal layered structure with an R3m space group. Furthermore, since it had a small peak around 20°, lithium therein was substituted for a part of a metal site.

The positive active material had a and c lattice constants of 2.834 and 14.208 Å. Its very weak superlattice reflections at about 20° and 24° are known to correspond to the ordering of Li, Co, and Mn ions in the transition metal sites of the layered lattice. In addition, as shown in FIG. 1, a peak appeared higher than others in a side of 003. This indicates that the nanowire was disposed in one side and the positive active material had high strength.

Therefore, the ICP-MS result of the positive active material of Example 1 shows that $Li_{1.3}Co_{0.4}Mn_{0.6}O_{4.9}$ standardized as $LiMnO_2$ was formed. This compound is represented by a Chemical Formula of $Li_{0.88}[Li_{0.12}Co_{0.33}Mn_{0.49}]O_2$.

Figure 2:
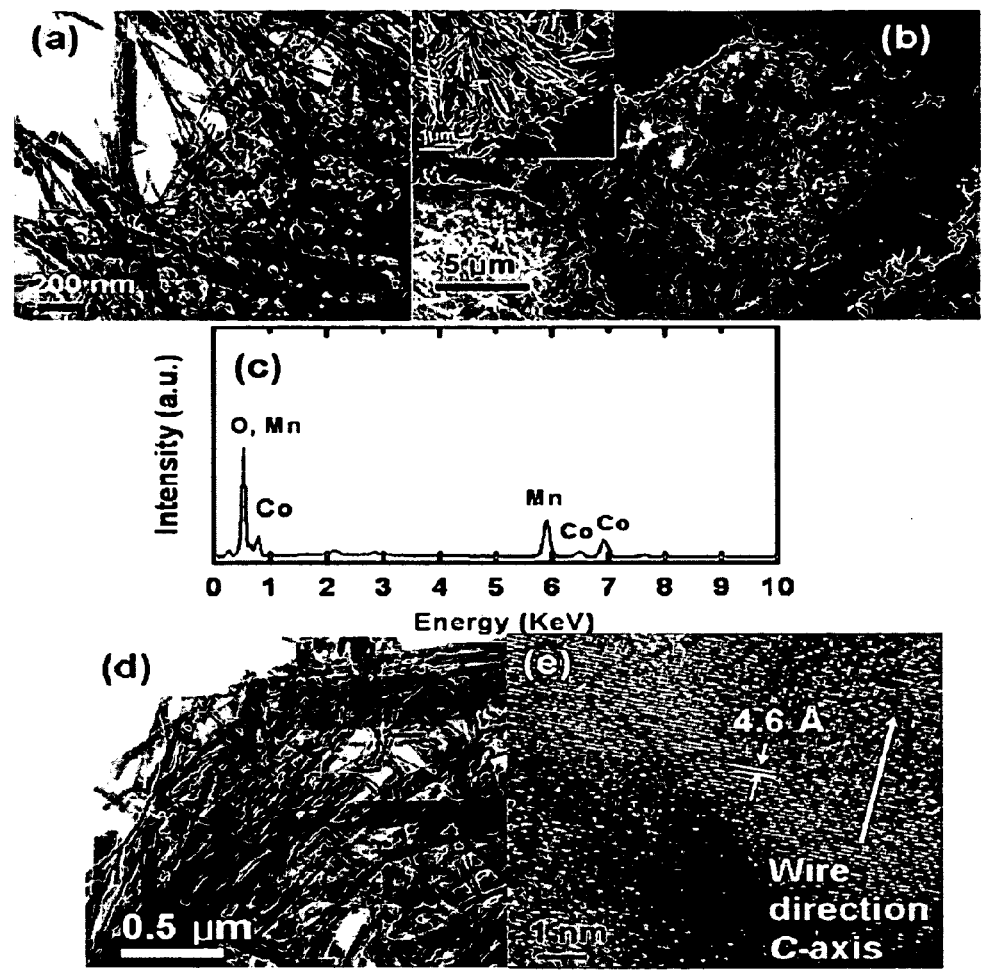
FIG. 2 (a) shows a TEM photograph of the $Co_{0.4}Mn_{0.6}O_2$ nanowire, (b) shows a SEM photograph of the $Li_{0.88}[Li_{0.12}Co_{0.33}Mn_{0.49}]O_2$ nanowire positive active material according to Example 1 of the present invention, (d) shows a TEM photograph thereof, (e) shows an HREM photograph thereof, and (c) shows EDS measurement results thereof.

SEM and TEM Photographs and EDS (Energy-Dispersive X-Ray Spectrometry) Measurement FIG. 2 shows TEM and SEM images and EDS measurements of the $Co_{0.4}Mn_{0.6}O_2$ nanowire and the $Li_{0.88}[Li_{0.12}Co_{0.33}Mn_{0.49}]O_2$ nanowire positive active material of Example 1. The TEM photograph was measured by using a JEOL 2010F electron microscope working at 200 kV.

In FIG. 2, (a) shows the TEM photograph of the $Co_{0.4}Mn_{0.6}O_2$ nanowire according to Example 1, and (b) shows the SEM photograph of the $Li_{0.88}[Li_{0.12}Co_{0.33}Mn_{0.49}]O_2$ nanowire positive active material. In addition, (d) in FIG. 2 shows the TEM photograph of the $Li_{0.88}[Li_{0.12}Co_{0.33}Mn_{0.49}]O_2$ nanowire positive active material, and (e) shows HREM (high-resolution electron microscopy) of one of the wires shown in (d). In order to measure the HREM, a sample was prepared by evaporation of the dispersed positive active material of Example 1 in acetone and volatilizing on a carbon-coated copper grid.

As shown in FIG. 2(a), the $Co_{0.4}Mn_{0.6}O_2$ nanowire of Example 1 had a diameter of 40 nm and a length of longer than 1 μm. In addition, as shown in (b) FIG. 2, after reaction with the $Co_{0.4}Mn_{0.6}O_2$ nanowire with the lithium nitrate, the dimensions of the nanowires increased so that the resulting active material had a large-sized nanowire having a diameter of 80 nm and a length of longer than 3 μm. The inset of (b) of FIG. 2 is an enlarged image of the edge parts of the nanowires, confirming that the particles consisted of aggregated individual nanowires. The TEM image in (d) of FIG. 2 shows that the positive active material included a nanowire with a diameter of about 50 nm. The HREM image in (e) of FIG. 2 clearly shows the formation of the layered structure with the lattice fringe of the (003) plane corresponding to 0.46 nm. In addition, a number of abnormally grown nanowires with a diameter of 50 nm and a length of 10 μm were observed.

In FIG. 2, (c) shows EDS measurements of the positive active material of Example 1. As a result, it shows the presence of both Co and Mn. In addition, the ICP-MS measurements of the positive active material of Example 1 confirmed stoichiometry of $Li_{0.88}[Li_{0.12}Co_{0.33}Mn_{0.49}]O_2$.

When the distance between layers that was repeatedly observed with the same spacing in (d) of FIG. 2 was determined, d spacing distance was confirmed at about 4.1 Å, corresponding to the (003) plane. This result indicated that the positive active material has a layered hexagonal structure. Furthermore, the positive active material had a BET (Brunauer-Emmett-Teller) specific surface area of 50 m²/g.

Charge and Discharge Characteristic

Figure 3:
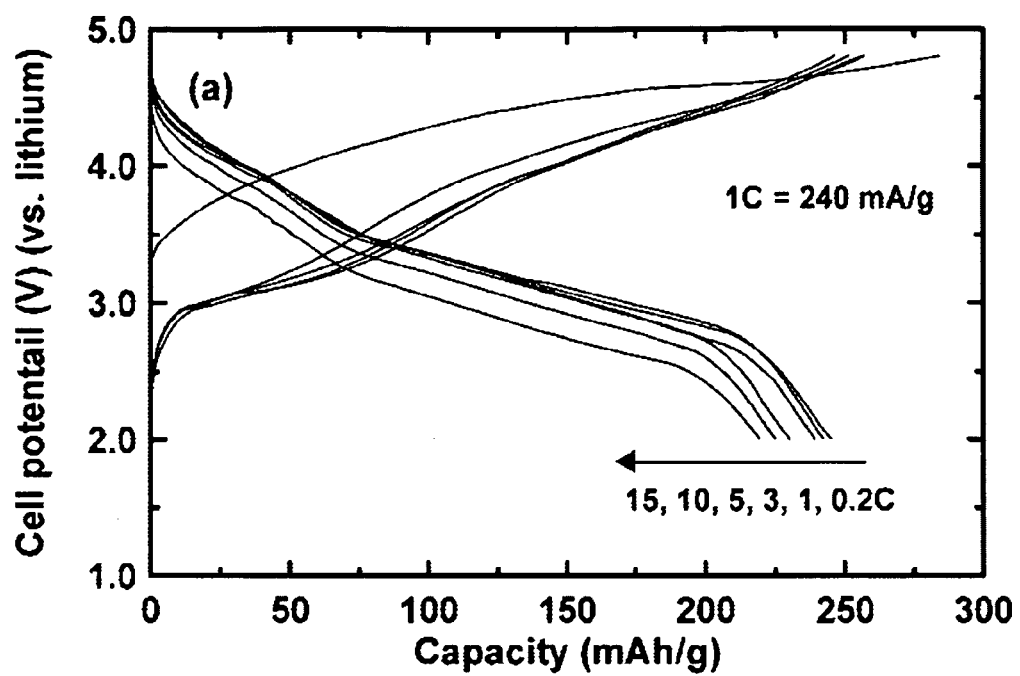
FIG. 3 shows the results of initial discharge capacity and voltage of a cell, when the cell including the positive active material according to Example 1 of the present invention is charged and discharged between 4.8 to 2V at 0.2 C, 1 C, 3 C, 5 C, 10 C, and 15 C (1 C=240 mAh/g) discharge rates (the charge rate was fixed at 1 C) at speeds corresponding to 245, 242, 238, 230, 225, and 220 mAh/g.

Cells including the positive active material of Example 1 were charged and discharged between 4.8 to 2V at rates of 0.2, 1, 3, 5, 10, and 15 C (1 C=240 mA/g), corresponding to capacities of 245, 242, 238, 230, 225 and 220 mAh/g, respectively (charge rate was fixed at 1 C). FIG. 3 shows initial discharge capacity and voltage. As shown in FIG. 3, after the first charge process, the plateau vanished in the subsequent cycles by increasing charge and discharge rates. When a $Li_2MnO_3$-based oxide was used as a positive active material, a battery was reported to have a distinct flat plateau region at about 4.5V. On the other hand, a battery including $Li_{0.88}[Li_{0.18}Co_{0.33}Mn_{0.49}]O_2$ had an inclined plateau at about 4.6V as shown in FIG. 3. The reason why the $Li_{0.88}[Li_{0.18}Co_{0.33}Mn_{0.49}]O_2$ nanowire had an inclined plateau at about 4.6V instead of the flat plateau is because the flat plateau turns into an inclined plateau with increasing Co or Cr contents. This is because more transition metal (Co or Cr) is available to be involved in the redox reaction, and oxygen loss should not be required for the material higher transition metal content to remove all the Li from the Li layer.

As shown in FIG. 3, the cells had charge and discharge capacities of 283 and 245 mAh/g, respectively, during the first cycle at 0.2 C and coulombic efficiency of 87%.

In addition, a cell including the positive active material of Example 1 was charged and discharged at 0.2 C for three cycles, at 1 C for four cycles, at 3 C for five cycles, at 5 C for seven cycles, at 10 C for eleven cycles, and at 15 C for twenty cycles. The cycle life characteristic results are shown in the upper graph of FIG. 4. It was charged and discharged at 1 C for 50 cycles. The cycle life characteristic result is shown in the lower graph of FIG. 4.

Figure 4:
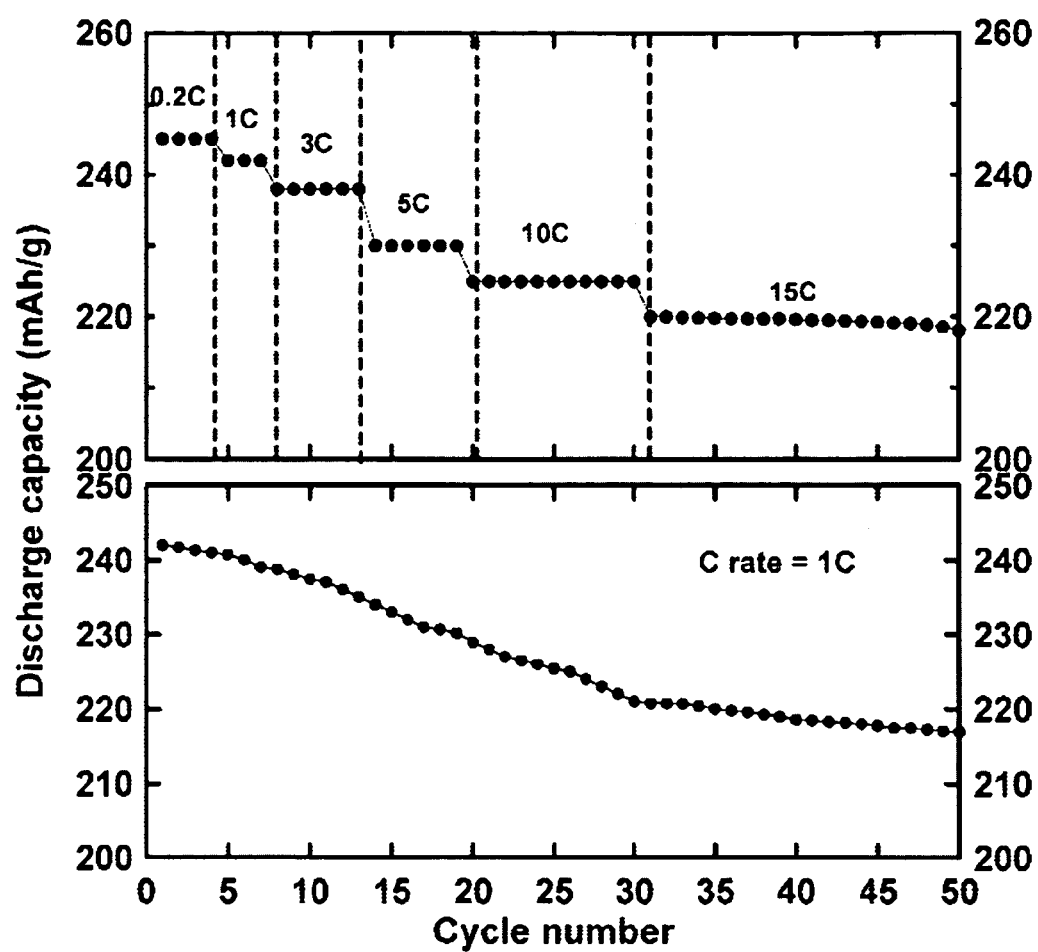
FIG. 4 shows cycle life characteristics of the cell according to Example 1 that was charged by varying between 0.2 C to 15 C for 20 cycles (upper graph), and cycle life characteristics of the cell according to Example 1 that was charged at 1 C for 50 cycles (lower graph).

As shown in the upper graph of FIG. 4, the cell had capacity retention of 90% at 15 C, compared to that at 0.2 C. The capacity retention even after repetitive cycling at 15 C was 98%. In addition, as shown in the lower graph of FIG. 4, after 50 cycles at 1 C, capacity retention was 92%.

Next, in order to evaluate rate characteristics depending on particle distribution and size, $Li[Ni_{0.20}Li_{0.2}Mn_{0.6}]O_2$ nanoparticles of Comparative Example 1 were prepared as secondary particles with an average particle diameter of 1-20 μm by agglomerating primary particles with an average particle diameter of 80-200 nm. The nanoparticles of Comparative Example 1 had first discharge capacity of about 280 mAh/g at 20 mA/g, but the discharge capacity significantly decreased to 210 mAh/g at 400 mA/g.

On the other hand, the nanowire positive active material of Example 1 had a uniform diameter of about 50 nm. It also had better rate capability than that of Comparative Example 1 since it had first discharge capacity of 245 mAh/g at 48 mA/g and 200 mAh/g at 3000 mA/g.

The $Li[Ni_{0.41}Li_{0.08}Mn_{0.51}]O_2$ nanoparticles of Comparative Example 2 with a BET surface area of 24 m²/g and an average particle diameter of 20-200 nm had capacity retention of 89% at a current rate of 1200 mA/g, but the nanowire of Example 1 had a higher capacity retention of 94% at the same current. This capacity retention difference is particularly large at a high current speed.

Accordingly, the capacity retention of the nanowire is expected to be much higher than that of nanoparticles at a higher current rate of more than 1200 mA/g. A nanowire with a high specific surface area increases an electrode/electrolyte contact area. Then, the increased area may decrease the diffusion path of active material particles into a lattice and strain of lithium intercalation. Accordingly, the nanowire may have an improved cycle characteristic compared with nanoparticles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for an electrochemical cell, wherein the positive active material
   (a) consists of aggregated individual nanowires wherein each individual nanowire has a diameter between 50 nm and 80 nm, and
   (b) comprises $Li_x[Li_{1-y-z}M^1_yM^2_z]O_{2-\alpha}D_\alpha$
   wherein
   $0.8 \leq x \leq 1.1$, $0 \leq y \leq 0.5$, $0 \leq z \leq 0.5$, and $0 \leq \alpha \leq 0.05$;
   $M^1$ is selected from the group consisting of Al, Co, Mn, Cr and Fe,
   M2 is selected from the group consisting of Al, Co, Ni, Mn, Cr, Fe, and combinations thereof, $M^1$ is different from $M^2$; and
   D is selected from the group consisting of O, F, S, P, and combinations thereof.

2. The positive active material of claim 1, wherein the nanowire has a length ranging from 0.5 μm to 50 μm.

3. The positive active material of claim 1, which has a layered structure.

4. A method of preparing a positive active material of claim 1, wherein the positive active material:
   (a) consists of aggregated individual nanowires wherein each individual nanowire has with a diameter between 50 nm and 80 nm, and
   (b) comprises $Li_x[Li_{1-y-z}M^1_yM^2_z]O_{2-\alpha}D_\alpha$, and
   the method comprising:
   preparing an oxide nanowire comprising $M^1$ and $M^2$;
   mixing the oxide nanowire with a lithium compound;
   allowing the mixture to stand; and
   drying the mixture,
   wherein
   $0.8 \leq x \leq 1.1$, $0 \leq y \leq 0.5$, $0 \leq z \leq 0.5$, and $0 \leq \alpha \leq 0.05$,
   $M^1$ is selected from the group consisting of Al, Co, Mn, Cr and Fe,
   $M^2$ is selected from the group consisting of Al, Co, Ni, Mn, Cr, Fe, and combinations thereof,
   $M^1$ is different from $M^2$, and
   D is selected from the group consisting of O, F, S, P, and combinations thereof.

5. The method of preparing of claim 4, wherein the oxide nanowire is mixed with a lithium compound in a weight ratio of 1:2 to 1:4.

6. The method of preparing of claim 4, wherein a metal compound is added while the oxide nanowire is mixed with the lithium compound.

7. The method of preparing of claim 4, wherein the allowing the mixture to stand is performed at a temperature of 200 to 250° C. for 12 to 48 hours.

8. The method of preparing of claim 4, wherein the drying is performed at a temperature of 100 to 200° C. for 12 to 48 hours.

9. The method of preparing of claim 4, wherein the oxide nanowire comprising $M^1$ and $M^2$ is prepared by
   preparing a gel by adding a gel formant to a compound solution,
   primarily heat-treating the gel,
   mixing the heat-treated gel with an $M^2$ compound, and
   secondarily heat-treating the mixture.

10. The method of preparing of claim 9, wherein the gel formant is fumaric acid.

11. The method of preparing of claim 9, wherein the primary heat treatment is performed at 400 to 700° C. for 1 to 20 hours.

12. The method of preparing of claim 9, wherein the secondary heat treatment is performed at 150 to 250° C. for 2 to 48 hours.

13. An electrochemical cell comprising:
    a positive electrode comprising a positive active material that
    (a) consists of aggregated individual nanowires wherein each individual nanowire has a diameter between 50 nm and 80 nm and
    (b) comprises $Li_x[Li_{1-y-z}M^1_yM^2_z]O_{2-\alpha}D_\alpha$;

a negative electrode comprising a negative active material; and
    an electrolyte,
    wherein
    $0.8 \leq x \leq 1.1$, $0 \leq y \leq 0.5$, $0 \leq z \leq 0.5$, and $0 \leq \alpha \leq 0.05$,
    $M^1$ is selected from the group consisting of Al, Co, Mn, Cr and Fe,
    $M^2$ is selected from the group consisting of Al, Co, Ni, Mn, Cr, Fe, and combinations thereof,
    $M^1$ is different from $M^2$, and
    D is selected from the group consisting of O, F, S, P, and combinations thereof.

14. The electrochemical cell of claim 13, wherein the nanowire has a length ranging from 0.5 μm to 50 μm.

15. The electrochemical cell of claim 13, which has a layered structure.

* * * * *